W. MAUSS.
CENTRIFUGAL APPARATUS.
APPLICATION FILED JULY 11, 1914.
1,146,269.
Patented July 13, 1915.
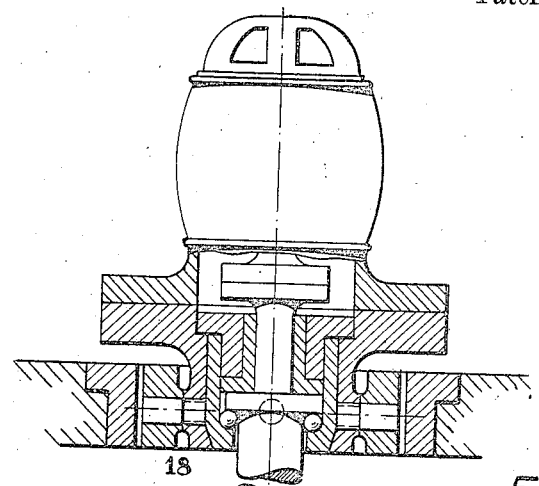
Fig. I
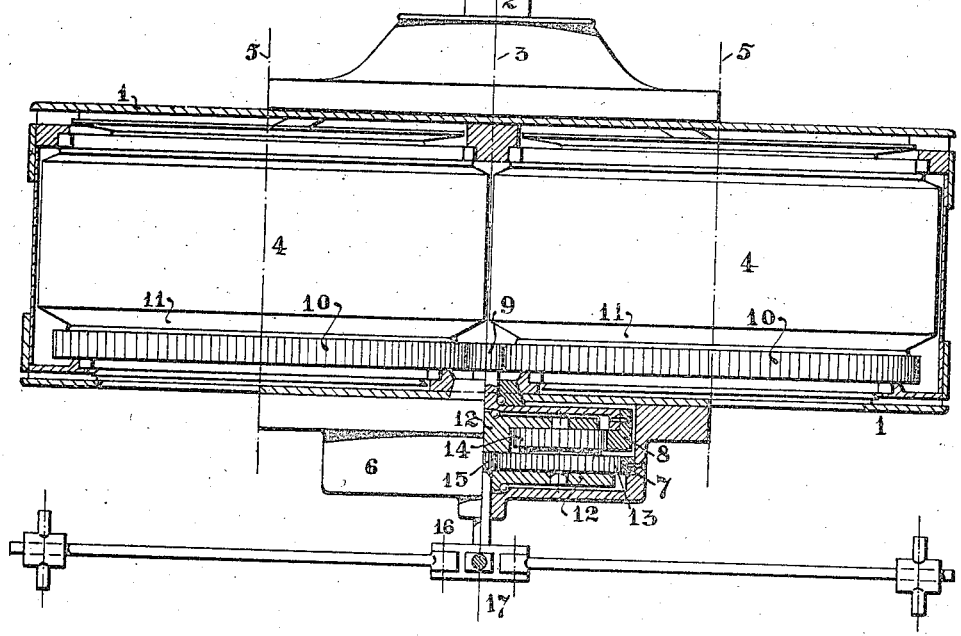
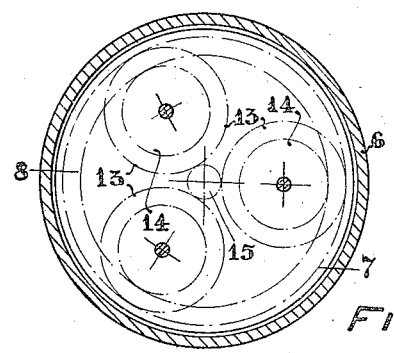
Fig. II
Witnesses:
Judith Pardee
Clerice Franck
Inventor
Wilhelm Mauss
by his Attorney sigma
UNITED STATES PATENT OFFICE.

WILHELM MAUSS, OF JOHANNESBURG, TRANSVAAL, SOUTH AFRICA.

CENTRIFUGAL APPARATUS.

1,146,269.  Specification of Letters Patent.  Patented July 13, 1915.

Application filed July 11, 1914. Serial No. 850,304.

*To all whom it may concern:*

Be it known that I, WILHELM MAUSS, a subject of the King of Great Britain, of Commercial Exchange Building, Johannesburg, Province of the Transvaal, Union of South Africa, but presently of London, England, have invented certain new and useful Improvements in Centrifugal Apparatus, of which the following is a specification.

The present invention has reference to centrifugal apparatus of the planetary type embodying a number of drums or vessels which are rotated rapidly about a main axis and slowly about their individual axes.

The invention consists in the improved means hereafter described for effecting the rotation of the vessels about their own axes.

In the accompanying drawings:—Figure I is a general view of a centrifugal separator embodying the invention. Fig. II is an inverted partial plan thereof taken through the casing 6.

1 indicates the main rotating frame of the separator having a driving shaft 2 by which it is rotated about its axis 3. The frame 1 carries the drums or vessels 4 so mounted that they may revolve individually about their own axes 5.

6 indicates a casing fixed to the frame 1 and having fixed within it the internally toothed wheel 7 the axis of which co-incides with the main axis 3. Mounted rotatably within the casing 6 is a second internally toothed wheel 8 co-axial with wheel 7. From wheel 8 extends a pinion 9 gearing with an annular rack 10 on each of the drums 4. Said rack is formed on the inwardly directed end flange 11 of the drum so that it and the pinion 9 do not prevent the drums from being brought close up to the main axis 3, as is desirable for the proper operation of the separator.

12 is a wheel carrier rotatably mounted within the casing 6.

13, 14 indicates several pairs of toothed wheels rotatably mounted in the carrier 12; the wheels of each pair being co-axial and rigidly connected with one another. Said wheels 13 and 14 differ in diameter, wheel 14 being shown smaller than wheel 13. They mesh respectively with the internally toothed wheels 7, 8. 15 is a pinion positioned on the axis 3 and meshing with either wheel 13 or 14. It is carried on a spindle 16 which extends out of the casing 6. Said spindle is suitably prevented from rotating as by the device 17 which at the same time permits it free lateral movement.

In operation the internally toothed wheel 7 rotates at high speed with the frame 1, causing wheel 13 to roll around the fixed pinion 15. The outer peripheral point of wheel 13 moves with the peripheral speed of wheel 7 while its inner peripheral point is stationary. Wheel 14 being rigid with and slightly smaller than wheel 13, its outer peripheral point moves with a linear speed slightly less than that of the outer peripheral point of wheel 13. The internally toothed wheel 8, which is in gear with said outer peripheral point of wheel 14 consequently moves with a slightly different angular velocity from wheel 7; in other words said wheel 8 has a slow movement relatively to wheel 7 and frame 1. Said relative movement is communicated by pinion 9 and racks 10 to the drums 4 which accordingly rotate slowly on their own axes 5.

It will be understood that although wheel 14 is described as being smaller than wheel 13, it could equally well be larger, the effect being simply to reverse the individual motion of the drums 4. Also as the primary function of the pinion 15 is simply to check the free motion of the wheels 13, 14 such checking can be effected by other means. For instance said pinion 15 could be dispensed with and the wheel carrier 12 could be fixed to the spindle 16, with some increase of the speed difference between the wheels 7 and 8.

The gear is preferably positioned at the bottom of the frame 1 as shown. Said frame can then be suspended by its shaft 2 from an overhead bearing 18 which is an advantageous manner of supporting a high speed body.

I claim:—

1. In a planetary centrifugal machine, the combination of a main rotating frame, drums mounted thereon to rotate about their individual axes, an internally toothed wheel secured to the main frame to rotate therewith, a second internally toothed wheel co-axial with and rotatable relatively to the first and geared to the drums, a pair of planet wheels of different diameters co-axial and rigidly connected with one another and meshing each with one of said internally toothed wheels and means connecting said planet wheels to an external fixture to restrain their free movement.

2. In a planetary centrifugal machine, the combination of a main rotating frame, drums mounted thereon to rotate about their individual axes, an internally toothed wheel secured to the main frame to rotate therewith, a second internally toothed wheel co-axial with and rotatable relatively to the first and geared to the drums, a pair of planet wheels of different diameters co-axial and rigidly connected with one another and meshing each with one of said internally toothed wheels, and a pinion co-axial with the internally toothed wheels and meshing with the planet wheels and non-rotatively fixed to an external part.

3. In a planetary centrifugal machine, the combination of a main rotating frame, drums mounted thereon to rotate on their individual axes and having inwardly directed end flanges, an internally toothed wheel secured to the main frame to rotate therewith, a second internally toothed wheel co-axial with and rotatable relatively to the first, a pinion carried by said second wheel, annular racks on the end flanges of the drums and engaged by said pinion, a pair of planet wheels of different diameters co-axial and rigidly connected with one another and meshing each with one of said internally toothed wheels and means connecting said planet wheels to an external fixture to restrain their free movement.

Signed by me at Glasgow this 3rd day of July 1914.

WILHELM MAUSS.

Witnesses:
   EDWARD JAMES PULLINGER,
   FRED MIDDLETON.